United States Patent [19]
Glavind

[11] Patent Number: 6,135,626
[45] Date of Patent: Oct. 24, 2000

[54] METHOD OF MOUNTING A FIBER OPTIC CABLE IN A LIGHTING UNIT, SUCH A UNIT AND A HOLDER FOR THE CABLE END

[75] Inventor: Mads Glavind, Havndal, Denmark

[73] Assignee: Martin Professional A/S, Risskov, Denmark

[21] Appl. No.: 09/207,767

[22] Filed: Dec. 9, 1998

[30] Foreign Application Priority Data

Dec. 9, 1997 [DK] Denmark .................. 1432/97

[51] Int. Cl.$^7$ .............. G02B 6/04; G02B 6/36; F21V 7/04; F21V 5/00
[52] U.S. Cl. ............ 362/554; 362/551; 362/581; 385/115; 385/76; 385/77; 385/78
[58] Field of Search .................... 362/554, 551, 362/581; 385/115, 76, 77, 78

[56] References Cited

U.S. PATENT DOCUMENTS

| | | | |
|---|---|---|---|
| 4,789,216 | 12/1988 | Schrott | 385/78 |
| 5,341,275 | 8/1994 | Ghandehari . | |
| 5,918,974 | 12/1998 | Suzuki et al. | 362/554 |
| 6,050,715 | 4/2000 | Hunger | 362/576 |

*Primary Examiner*—Sandra O'Shea
*Assistant Examiner*—Bryan P. Stanley
*Attorney, Agent, or Firm*—Nixon Peabody LLP; David S. Safran

[57] ABSTRACT

For installing a fiber optic cable in a lighting unit for illumination purposes it is suitable to insert the end of the fiber bundle to a position where the end of the bundle is illuminated by the full cross section of a conical light beam, whereby it is also possible to operate with bundles of different diameters. For this purpose, the invention provides for a technique enabling a standard cable holder to be used in a highly qualified manner for different cables, with both a firm fixation of the cable end and a high finish thereof. A very accurate positioning of the cable end in the light beam is achievable without particularly high accuracy requirements in the adaptation of the holder to the specific diameter of the cable.

10 Claims, 2 Drawing Sheets

METHOD OF MOUNTING A FIBER OPTIC CABLE IN A LIGHTING UNIT, SUCH A UNIT AND A HOLDER FOR THE CABLE END

BACKGROUND OF THE INVENTION

1. Field of the Invention

The present invention relates to a holder for the illuminated end of a bundle of optic fibers for light emission, e.g., for illumination in "star ceilings".

2. Description of Related Art

For optimal use of a common light source for this purpose, it is usual to employ a reflector lamp, the parabolic reflector of which acts for collecting of the light, i.e., emits the light inwardly towards a focal point or area located reasonably shortly in front of the reflector and the lamp. The optic fibers typically have a thickness of about 1 mm, and if only one or rather few fibers were used, their input ends could well be located just in this focal point. However, it is more usual to employ some 50–300 fibers which, at their input ends are held together in a tight bundle, by means of a holder for insertion in a holding socket of a lamp housing near the said focal point. In order to ensure that the whole of the end surface of this thicker fiber bundle is effectively illuminated, this end is placed not in the focal point, but spaced such a distance in front of this point that the light at this place, after having passed the focal point, has started to be spread again, viz. to such an extent that it will illuminate an area just corresponding to the area of the end of the fiber bundle. Thus, a high efficiency is achieved by a combination of two features, viz. the tight juxtaposition of parallel fiber ends and a well controlled axial positioning of the end surface of the bundle, all according the area size thereof.

It has been possible to take advantage of this combination in connection with differently sized holders for the ends of fiber bundles of different sizes, viz. in that holders for fiber bundles of respective thicknesses may comprise holder bushings adapted both thicknesswise and lengthwise to different bundle thicknesses, e.g., with jumps of 50 fibers.

It will thus be a possibility that a main portion of a holder may optionally be connected with different holder bushings which will then, when the main portion is inserted in a receiver socket in the lamp housing, automatically determine the correct axial position of the fiber ends, when these are cut in plane with the free outer end of the holder bushing.

However, a structurally simplified solution has already been proposed, viz. the use of a holder having an internal passage of such a conical shape which precisely corresponds to the conic envelope of the light beam, see U.S. Pat. No. 5,341,275. Hereby, a fiber bundle of any size between a given minimum and maximum will be introduceable into the holder for automatic achievement of a correct positioning of the end surface of the fiber cable in the holder, which may thus, after the mounting of the fiber cable therein, be inserted into a fixed position in a suitable fixture. From an immediate point of view, this will appear as the simplest possible solution, but it is connected with a practically very important drawback, viz. that the end surface of the fiber cable shall have to be finely worked prior to the fixation of the cable end in the holder. Typically, this fine working comprises a plane grinding and fine filing operation on the cable end, while the fixation is most efficiently effected by means of a gluing or joining substance. It has been found difficult to avoid that such a substance, by the said fixation, penetrates out through the end surface, whereby the effect of an already worked out fine finish will be more or less destroyed.

SUMMARY OF THE INVENTION

The invention provides a very simple and radical solution to the above-described problem in that the holder bushing having a conical throughpassage is shortened, preferably by cross sawing at the place of location of the end of the actual fiber cable, such that the cable end will nevertheless be located at the resulting free end of the bushing, whereafter a fixation and a final working of the cable end can be effected in a satisfactory manner.

In practice, this will imply that the holder tube or bushing should be made with a certain overlength, such that even when it is shortened to the largest operative inner diameter, it will still constitute a tubular member for reception in an external holder, such as a receiver socket, this not being known from said U.S. Pat. No. 5,341,275.

In this connection, it is a special feature that the holder may be shaped in such a manner that the bushing has a straight cylindrical outer side and a conical inner side, whereby the socket of the lamp housing can receive the bushing directly, whether or not it has been shortened more or less for the said adaptation to the cable diameter.

The bushing, which is thus also an adaptor, may suitably be designed as a monolithic body, preferably in light metal, e.g., aluminum. Under the said conditions with respect to fixed outer diameter and increasing/decreasing inner diameter, the bushing will, in the area along the length with smaller inner diameters, exhibit a relatively large wall thickness, whereby a cross sawing work in this area will be rather troublesome, in addition to the fitter having to mark the relevant cutting plane. In a preferred embodiment of the holder bushing, both of these troubles are remedied in that the bushings, beforehand, are produced with a series of exterior, annular grooves each of which, at their respective locations, extend inwardly almost to the interior wall of the bushing, and each having a width, e.g. 1.2 mm, allowing for a saw blade to be introduced into the groove. The cutting work will then be appreciably facilitated no matter which groove is selected.

The relevant grooves may, beforehand, be provided at locations that will be relevant cutting planes for different round numbers of fibers, e.g., with jumps of 25 fibers. This will greatly facilitate the said marking, as the fitter should then only notice that groove which, numerically is closest to or above the actual number of fibers. Should there be only a few surplus fibers, these may be forced together into the resulting opening, but otherwise it will be necessary to select the next larger opening in which the light conductors may then be received without being directly pressed together.

It is desirable that the fibers be arranged tightly bonded in the discussed opening, and it may, therefore, be a mounting prescription that the opening should be cast out with a glue or joining substance for fixation of the fiber ends in the opening and moreover for filling out the opening, should the number of light conductors be somewhat smaller than adapted for just this opening.

In order to maintain a reasonably short distance between the cable holder and the light source, the cone angle of the light beam should be relatively large, as also shown in said U.S. Pat. No. 5,341,275. Consequently, the cone angle of the passage in the holder bushing should be correspondingly large, whereby the axial distances between the diametral planes representing the said jumps of, e.g., 25 fibers will be relatively short. For the fitter, it will then be correspondingly difficult to mark precisely the relevant cutting place, or, respectively, it will be difficult to provide the said "sawing grooves" for desirably small jumps of fiber numbers, as the grooves will tend to overlap each other.

While this problem may obviously be avoided in designing the light source system to emit the light with a smaller cone angle, the invention includes the recognition that, in fact, this will not be necessary, as it is possible instead to use a cable holder, the inner cone angle of which is appreciably smaller, when only this holder is mountable in a position adjustable manner in the holder support or socket of the lamp housing, such that the said end surface of the optic cable all according to its size is situated just where it is illuminated by the entire cross section of the light beam. The relevant cutting planes of the holder bushing will then be located with increased mutual spacings, such that a correct marking or, respectively, the working out of the said grooves will be greatly facilitated or even enabled for jumps of a low number of light conductors.

In the following the invention is described in more detail with reference to the drawings.

DETAILED DESCRIPTION OF THE INVENTION

Figure 1:
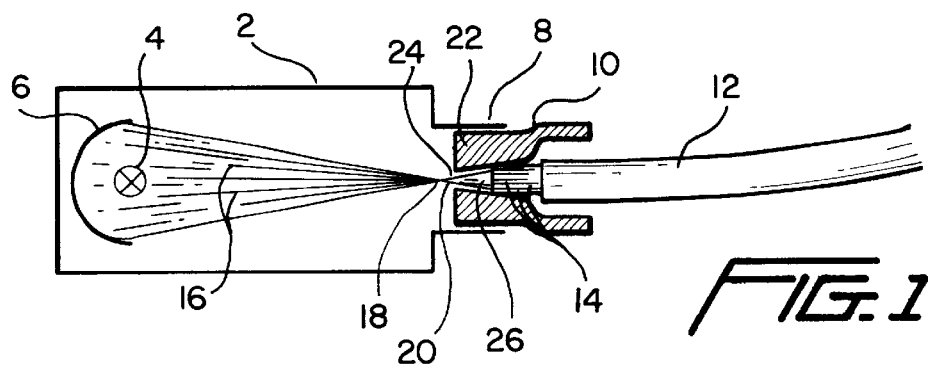
FIG. 1 is a schematic length sectional view of a lamp housing for supplying light to a bundle or cable of optic fibers.

In FIG. 1 a lamp housing 2 is shown, having, at one end, a bulb 4 with a reflector 6, and at an opposite end, a receiver socket 8 for a light conductor holder 10 with one or more outgoing bundles 12 of optic fibers 14. As shown, the light source system 4, 6 is designed such that the light beams 16 are collected forwardly towards a focal point or area 18 just behind the holder 10, whereafter the rays are spread fanwise into a conical light beam 20.

The holder 10 has a bushing portion 22, which is inserted in the socket 8, and the interior surface of which is shaped in a forwardly diverging, conical manner corresponding to the conic envelope of the beam bunch 20. It will be understood that the bundle of fibers 14 will be effectively illuminated when the end surface 26 of the this bundle is located axially at such a place in the bushing 22 that it will just fill out the relevant cross section of the conical bore.

Figure 2:
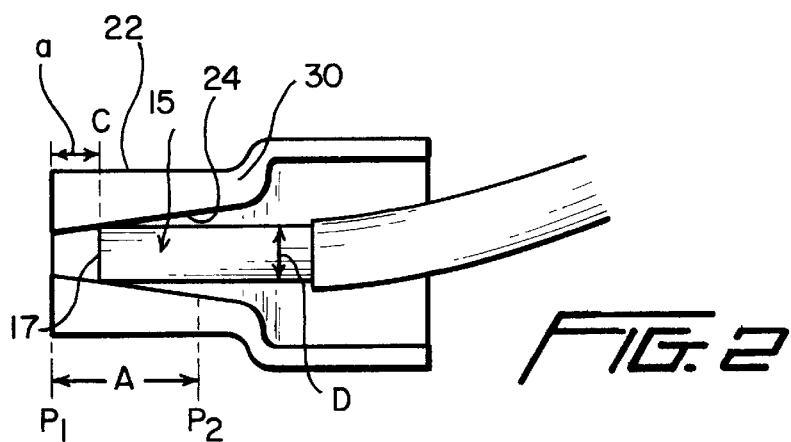
FIG. 2 is a sectional view of a first holder according to the invention.

The holder 10 with the bushing 22 is shown in FIG. 2. The part of the holder marked with a distance arrow A is known in the art. Admittedly this part will be able to receive any optic fiber bundle 15 with a diameter D between the internal diameters at the cross planes P1 and P2, provided the end surface 17 of the bundle 15 is already worked for high light receptability. It remains, however, that the bundle end should preferably be safely fixed to the throughpassage 24 of the bushing 22. If this is done in a simple manner by means of glue, a possible result will be that the glue will penetrate to the end surface 17 and thus to some degree spoil the light receptability thereof.

On this background the invention prescribes that the bushing 22 should be shortened by a cross cutting in the plane C of contact between the cable end and the conical throughpassage 24, such that it is possible to thereafter finally work the surface 17 with the desired finish. This requires that the bushing 22 be made of a reasonably easily cuttable material such as aluminum and that the bushing, in addition to its known length portion A, has a further, outermost portion 30 in order to be seizable by the socket 8, should the cross cutting happen to be relevant at the operational maximum diameter of the throughpassage in the plane P2.

The fitter may determine the correct cutting plane in various manners, e.g. by first measuring the actual intrusion depth of the fiber bundle 15 or by conferring with a tablework specifying different cutting distances a from the free end of the bushing for different cable diameters, given e.g. by different numbers of optic fibers of some standard diameter.

Figure 3:
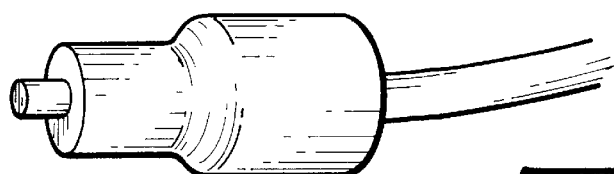
FIGS. 3 and 4 are perspective views of the first holder.
Figure 4:

In practice a recommendable mounting method is to first determine the correct plane of cutting for the actual bundle of fibers and then make sure that the actual bundle is just able to be pushed out through the resulting front hole of the bushing in a compact manner. If it is not fully compact, some inoperative, short fibers may be added to fill out the hole. Thereafter, FIG. 3, the projecting end of the fiber bundle is cut off just outside the resulting end of the bushing. Then, FIG. 4, the bushing is held in an upright position, and the remaining, shortly protruding end of the fiber cable is surrounded by a tape collar 32, which is thereafter filled with a suitably low-viscid glue substance (e.g. Locktite 401), which will soak the fiber end area and create cohesion between the fibers as well as between the entire bundle and the inner wall of the through passage 24.

Figure 5:
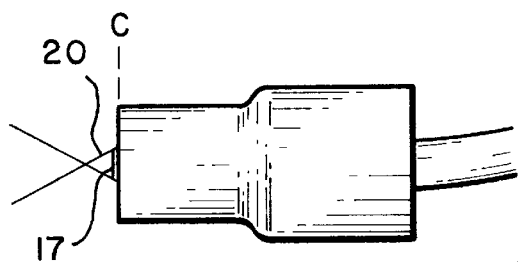
FIG. 5 is a lateral view of the first holder.

Thereafter the collar 32 is removed, and the slightly protruding end surface 17 is subjected to a final working such as a cutting and a filing by first a coarse file and then by a fine file or a polishing disc. Then the holder 10, 22, FIG. 5, can be mounted in the lighting unit such that the fixed and highly light receptable end surface 17 is located just where it is hit by the full cross section of the conical light beam 20.

This implies that the holder 10 is mounted in the same position relative to the lighting unit, irrespectively of the length degree of cutting off of its front end. When the cone angle of the light beam is large, this will imply that the marking and cutting of the bushing should take place with extreme accuracy, even if based on tolerance intervals of e.g. 25 fibers. A preferred embodiment of the holder shown in FIG. 6 should be seen on this background.

Figure 6:
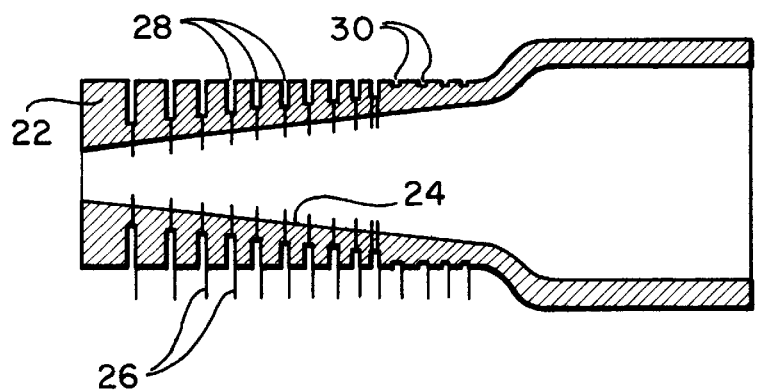
FIG. 6 is a length sectional view of a preferred embodiment of a cable holder bushing according to the invention.

The holder shown in FIG. 6 exhibits a longer tubular portion 22, with an inner conic slope which, in return, is appreciably reduced. Therefore, there will be a longer spacing between the cross planes 26 defining the axial location of the end faces of the respective cables or fiber bundles, and these planes are marked with lathed grooves 28 which, as mentioned, will facilitate a cutting of the bushing at the selected cross plane.

For obtaining a correct placing in the socket 8, the holder tube should be inserted therein to such a depth that the end opening of the optionally cut-off front end will be located just at the place where this opening will accommodate the cross section of the incident light beam 20. As shown in FIG. 6, it is preferred that the inner wall 24 is shaped with a rectilinear generator and that in the forward direction, therefore, i.e., towards the right, the grooves will appear with a decreasing mutual spacing when representing the said modular jumps of fiber numbers. The grooves will also be usable as "counter marks" for facilitating a correct insertion depth into the socket 8, viz. as being given by a fixed number of groove spacings. In the connection, some foremost marker grooves 30 (still viewed in the direction of the light)

may be provided, these grooves not being intended to by sawing markers, but only counting markers for use for a correct insertion of the holder after the cutting thereof at one of the grooves 28 representing the larger ones of the operative openings of the interior bushing wall 24.

Figure 7:
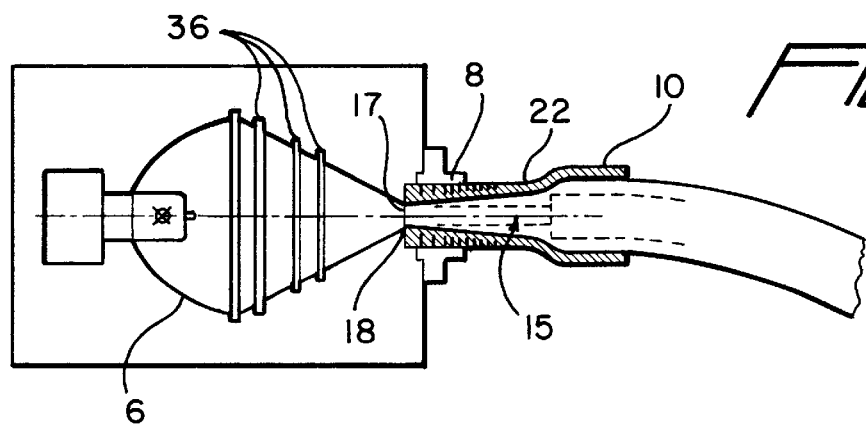
FIGS. 7–9 are schematic side views illustrating the insertion of differently shortened holders in the lighting unit.

FIG. 7 illustrates the insertion of the unshortened holder 10, 22 in the socket 8 of lighting unit emitting a conical light beam with a relatively large cone angle. The end of the narrow fiber bundle of, e.g., bundle of 15 of 50 fibers 14 is located in or close to the focal area 18 of the lamp.

Figure 8:
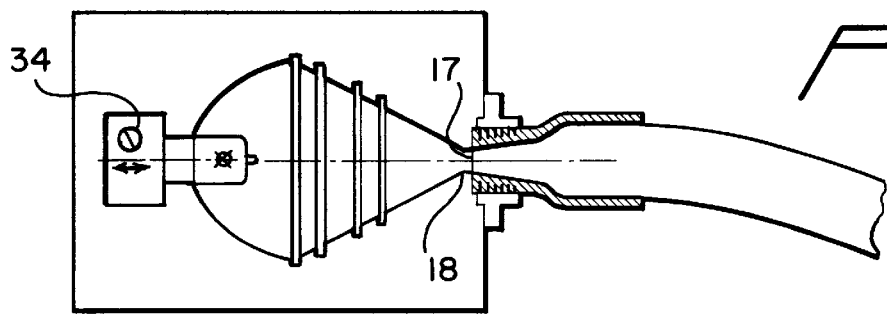
Figure 9:
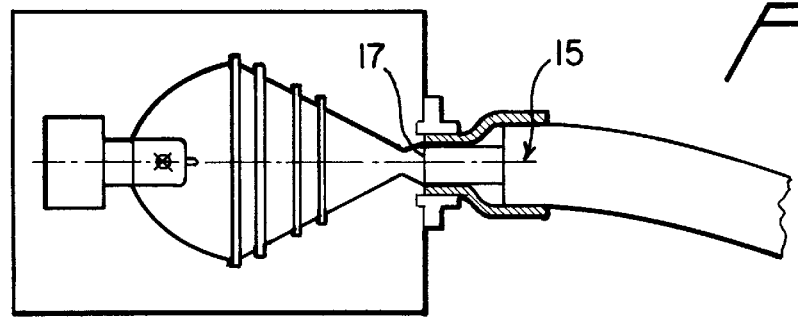

In FIG. 8, the bushing has been cut approximately midways, e.g., for accommodating 175 fibers, and the cable end is placed at the correspondingly larger cross section of the widening light beam. FIG. 9 shows the correct insertion of a bushing cut to maximum of capacity of 300 standard fibers. It will be appreciated that the result corresponds to the ideal of FIG. 1, but with the important difference that the cable ends have now been finely worked and well fixed. The axial displacement of the cable end between FIGS. 7 and 9 is very short, but due to the smaller cone angle and bigger and bigger length of the bushing 22 the working tolerances have nevertheless been rather large.

An alternative, as suggested in FIG. 8, would be to insert the end of the bushing to a fixed end position, no matter the size of the cable end, and then carry out an adjustment of the axial position of the light source 4,6, e.g., by means of an adjustment screw 34, which may co-operate with a scale referring to the number of fibers.

Elements 36 shown in FIGS. 7–9 are various diffusers, shields and filters as well known in the art.

The holder according to the invention is designed with an outermost, widened head portion 32, in which there is receivable not only the relevant fiber bundle or bundles, but also the surrounding cable sleeves which, after a sort of "de-isolation", is removed from the end or ends of the cables introduced into the holder bushing 22. Free space in this portion may be filled out by a suitable filler substance.

What is claimed is:

1. A method of mounting an input end of a fiber optic cable for illumination purposes in a lighting unit emitting a conical light beam of a first cone angle at an end of the cable using a tubular holder having a conical through-passage with a second cone angle, said method comprising the steps of:

a) determining a depth of intrusion of a fiber bundle of the cable into the through-passage of the holder for an end of the fiber bundle to substantially fill out a relevant cross section of the conical through-passage, all according to a diameter of the fiber bundle;

b) cutting the tubular holder at a place corresponding to the depth of intrusion determined to produce a new end opening;

c) arranging the fiber bundle in the holder such that a smooth end surface of the fiber bundle is located in or slightly outside the new end opening;

d) applying adhesive to an end area of the fiber bundle;

e) finish working said end area; and f) mounting the holder in the lighting unit such that said end area substantially fills out a cross section of the conical light beam.

2. A method according to claim 1, wherein the conical through-passage of the holder has a cone angle which is smaller than said first cone angle; and wherein said mounting step includes the step of effecting individual adjustment of the location of the holder or individual adjustment of the conical light beam to achieve coincidence between said end area and a cross section of the conical light beam.

3. A lighting unit for illuminating an input end of an optic fiber bundle in illumination systems, comprising a lamp and an optical system for transmitting a conical light beam therefrom, and carrier means for supporting a holder for receiving the input end of a fiber bundle of one or more fiber optic cables, said holder having a conical through-passage for receiving the end of the fiber bundle in a position filling out the cross section of said through-passage with the entire end surface of said bundle exposed to substantially the full conical light beam irrespective of the intrusion depth of the bundle into the through-passage, wherein:

said holder is made of a readily cuttable material for enabling shortening thereof by cutting and has a tubular portion containing said conical through-passage, said tubular portion being seizable by said carrier means even upon shortening of said holder to a largest operative diameter of the through-passage.

4. A lighting unit according to claim 3, wherein said through-passage has a cone angle which is smaller than that of the conical light beam.

5. A lighting unit according to claim 4, wherein said holder has the shape of a bushing with said conical through-passage located centrally in a straight cylindrical bushing portion, in an outer wall of the bushing being provided with a row of annular grooves of a respective depth such that a bottom of each groove is located a short distance from an inner surface bounding the conical through-passage, and each groove having a width that is sufficient for insertion of a saw blade therein.

6. A lighting unit according to claim 4, wherein said carrier means is adapted for holding the holder in different axial positions thereof.

7. A lighting unit according to claim 4, further comprising a light source; wherein said carrier means is arranged for receiving a shortened holder with an inner end of the holder at a fixed position in the unit; and wherein the light source is positionally adjustable in an axial direction of the light beam.

8. A tubular holder for a fiber bundle of one or more fiber optic cables to be mounted in a lighting unit emitting a conical light beam against an inner end of the holder, the holder having a conical through-passage and being made of a readily cuttable material for enabling shortening thereof by cutting; wherein the holder has a tubular portion containing said conical through-passage, said tubular portion being seizable by a carrier means of the lighting unit even upon shortening of said holder to a largest operative diameter of the through-passage.

9. A tubular holder according to claim 8, wherein said holder has the shape of a bushing with said conical through-passage located centrally in a straight cylindrical bushing portion, an outer wall of the bushing being provided with a row of annular grooves of a respective depth such that a bottom of each groove is located a short distance from an inner surface bounding the conical through-passage, and each groove having a width that is sufficient for insertion of a saw blade therein.

10. A tubular holder according to claim 9, wherein said grooves are provided at locations along said through-passage which have diameters corresponding to respective specific numbers of standard fibers which will fill out the respective diameter of the through-passage at that location.

* * * * *